(12) United States Patent
Miura et al.

(10) Patent No.: US 11,442,229 B2
(45) Date of Patent: Sep. 13, 2022

(54) OPTICAL CIRCUIT FOR ALIGNMENT

(71) Applicant: Nippon Telegraph and Telephone Corporation, Tokyo (JP)

(72) Inventors: Toru Miura, Tokyo (JP); Yoshiho Maeda, Tokyo (JP); Hiroshi Fukuda, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/734,904

(22) PCT Filed: May 16, 2019

(86) PCT No.: PCT/JP2019/019493
§ 371 (c)(1),
(2) Date: Dec. 3, 2020

(87) PCT Pub. No.: WO2019/235163
PCT Pub. Date: Dec. 12, 2019

(65) Prior Publication Data
US 2021/0181425 A1    Jun. 17, 2021

(30) Foreign Application Priority Data

Jun. 5, 2018 (JP) .............................. JP2018-107632

(51) Int. Cl.
*G02B 6/34* (2006.01)
*G02B 6/124* (2006.01)
*G02B 6/30* (2006.01)

(52) U.S. Cl.
CPC ............... *G02B 6/34* (2013.01); *G02B 6/124* (2013.01); *G02B 6/305* (2013.01)

(58) Field of Classification Search
CPC ........... G02B 6/34; G02B 6/305; G02B 6/124
USPC ......................................................... 385/37
See application file for complete search history.

(56) References Cited

U.S. PATENT DOCUMENTS

| | | | |
|---|---|---|---|
| 7,024,066 B1 * | 4/2006 | Malendevich | G02B 6/122 385/11 |
| 10,088,299 B2 | 10/2018 | Tokushima | |
| 2018/0010906 A1 * | 1/2018 | Tokushima | G02B 6/34 |

FOREIGN PATENT DOCUMENTS

JP          2018005067 A        1/2018

OTHER PUBLICATIONS

Coster, et al., "Test-station for flexible semi-automatic wafer-level silicon photonics testing," 21st IEEE European Test Symposium (ETS), 2016, 6 pages.

(Continued)

*Primary Examiner* — Michael P Mooney
(74) *Attorney, Agent, or Firm* — Slater Matsil, LLP

(57) ABSTRACT

An optical waveguide in which a grating coupler is formed, a first pattern region arranged to surround the grating coupler, and a second pattern region arranged to surround the grating coupler are included. The first pattern region and the second pattern region are arranged adjacently. In a periphery of the grating coupler, the first pattern region is formed in a region continuous in a circumferential direction. Similarly, in the periphery of the grating coupler, the second pattern region is formed in a region continuous in the circumferential direction.

10 Claims, 7 Drawing Sheets

(56) References Cited

OTHER PUBLICATIONS

Li, et al., "CMOS-compatible high efficiency double-, etched apodized waveguide grating coupler," Optics Express, vol. 21, No. 7, Apr. 8, 2013, pp. 7868-7874.

* cited by examiner

OPTICAL CIRCUIT FOR ALIGNMENT

CROSS-REFERENCE TO RELATED APPLICATIONS

This application is a national phase entry of PCT Application No. PCT/JP2019/019493, filed on May 16, 2019, which claims priority to Japanese Application No. 2018-107632, filed on Jun. 5, 2018, which applications are hereby incorporated herein by reference.

TECHNICAL FIELD

The present invention relates to an alignment optical circuit used for optical connection between a grating coupler and an optical fiber.

BACKGROUND

A spot size converter, a spherical lensed fiber, and so forth have been used so far for optically connecting a silicon optical circuit with an optical fiber (optical connection) in order to improve efficiency of optical connection between a waveguide end surface and the optical fiber. In recent years, because of progress in micromachining techniques, many examples have been seen where a grating formed with a groove with a width of several hundred nm is provided to the silicon waveguide, gratings are caused to function as a grating coupler radiating light upward and downward from an optical waveguide to a substrate surface, and optical connection with the optical fiber is performed.

For example, in silicon photonics, a technique has been suggested which uses a grating coupler for optical connection with an optical fiber (see Non-Patent Literature 1). In this technique, a light emission angle of light from the grating coupler to an upper surface is an angle satisfying formula (1) described on p. 7,870 of Non-Patent Literature 1 and is set to an inclination angle within 20 deg. from a vertical direction to a substrate.

In a case where light is coupled with a grating coupler, a single mode fiber (SMF), a fiber array, or the like is used. In the following, a case of an SMF 303 will be described as an example with reference to FIG. 10. In this example, a grating coupler 302 is provided to an optical waveguide 301 formed on a substrate 300. In order to optically couple the SMF 303 with the grating coupler 302, alignment in a plane (XY plane) parallel with the plane of the substrate 300 is necessary, alignment for an angular direction θx is of course necessary, and for correct coupling, alignment for angular directions of θy and θz and for a distance Z between the grating coupler 302 and the SMF 303 is also necessary. Even if only one axis of those is out of alignment, correct optical coupling may not be achieved.

In order to perform such alignment, in general, a sample circuit for alignment (alignment optical circuit) is first prepared, and alignment is performed by using the prepared sample circuit. Next, an optical fiber is moved to a desired optical circuit by using a stepping motor or the like such that the relative positional relationship, set by the alignment, between the optical fiber and the sample circuit is established, and optical connection between the optical fiber and an optical circuit is performed in this state. In this state, for example, predetermined measurement in the optical circuit is performed (see Non-Patent Literature 2).

CITATION LIST

Non-Patent Literature

Non-Patent Literature 1: C. Li et al., "CMOS-compatible high efficiency double-etched apodized waveguide grating coupler", Optics Express, vol. 21, no. 7, pp. 7868-7874, 2013.

Non-Patent Literature 2: J. D. Coster et al., "Test-station for flexible semi-automatic wafer-level silicon photonics testing", 21st IEEE European Test Symposium, pp. 23-27, 2016.

SUMMARY

Technical Problem

Incidentally, it becomes possible to conduct adjustment of the above-described six axes only after an optical axis of an optical fiber is arranged in a region of a grating coupler. However, because the grating coupler is a small rectangular portion with one side being approximately 20 μm, it is not easy to arrange the optical axis of the optical fiber in the region of the grating coupler. Thus, the current system has a problem that alignment for obtaining optical connection between the optical fiber and the grating coupler is not easily conducted.

Embodiments of the present invention have been made for solving the above problem, and one object thereof is to enable alignment for obtaining optical connection between an optical fiber and a grating coupler to be easily conducted.

Means for Solving the Problem

An alignment optical circuit according to embodiments of the present invention includes: an optical waveguide in which a grating coupler is formed; a first pattern region being arranged to surround the grating coupler and being configured with plural patterns arrayed at a first gap; and a second pattern region being arranged to surround the grating coupler and being configured with plural patterns arrayed at a second gap different from the first gap, in which the first pattern region and the second pattern region are arranged adjacently.

In the above alignment optical circuit, the first pattern region and the second pattern region may be configured with plural stripe-like patterns.

The above alignment optical circuit includes a third pattern region being arranged to surround the grating coupler and being configured with plural patterns arrayed at a third gap different from the first gap and the second gap, in which the third pattern region is arranged adjacently to the first pattern region or the second pattern region.

In the above alignment optical circuit, the third pattern region may be configured with plural stripe-like patterns.

The above alignment optical circuit includes a reflection unit that reflects light guided in the optical waveguide by coupling by the grating coupler and returns the light to the grating coupler.

Effects of Embodiments of the Invention

As described above, in embodiments of the present invention, a first pattern region configured with plural patterns arrayed at a first gap and a second pattern region configured with plural patterns arrayed at a second gap different from the first gap are arranged in a periphery of a grating coupler, and an excellent effect may thus be obtained in which alignment for obtaining optical connection between an optical fiber and the grating coupler may be conducted easily.

DETAILED DESCRIPTION OF ILLUSTRATIVE EMBODIMENTS

Figure 1:
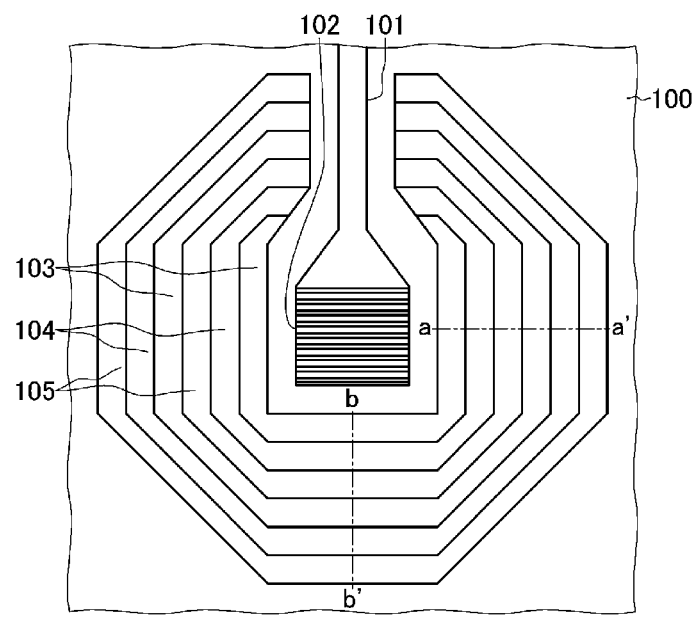
FIGS. 1 and 11 are plan views that illustrates a configuration of an alignment optical circuit in an embodiment of the present invention.

An alignment optical circuit in an embodiment of the present invention will hereinafter be described with reference to FIG. 1. This alignment optical circuit includes an optical waveguide 101 in which a grating coupler 102 is formed, a first pattern region 103 arranged to surround the grating coupler 102, and a second pattern region 104 arranged to surround the grating coupler 102. The first pattern region 103 and the second pattern region 104 are arranged adjacently. In this example, in a periphery of the grating coupler 102, the first pattern region 103 is formed in a region continuous in the circumferential direction. Similarly, in the periphery of the grating coupler 102, the second pattern region 104 is formed in a region continuous in the circumferential direction.

The first pattern region 103 is configured with plural patterns arrayed at an interval of a first gap. Further, the second pattern region 104 is configured with plural patterns arrayed at an interval of a second gap different from the first gap. Those are formed on a substrate 100. The first pattern region 103 and the second pattern region 104 are configured with plural stripe-like patterns, for example.

Further, in the embodiment, the alignment optical circuit includes a third pattern region 105 arranged to surround the grating coupler 102. The third pattern region 105 is configured with plural patterns arrayed at an interval of a third gap different from the first gap and the second gap. Further, the third pattern region 105 is arranged adjacently to at least one of the first pattern region 103 and the second pattern region 104. The third pattern region 105 is also formed on the substrate 100. The third pattern region 105 is configured with plural stripe-like patterns, for example. In this example, in the periphery of the grating coupler 102, the third pattern region 105 is formed in a region continuous in the circumferential direction.

In the embodiment, the first pattern region 103 is formed in the periphery of the grating coupler 102, the second pattern region 104 is formed in a periphery of the first pattern region 103, and the third pattern region 105 is formed in a periphery of the second pattern region 104. Further, in the embodiment, two sets of the first pattern region 103, the second pattern region 104, and the third pattern region 105 are provided. Note that the pattern configuring each of the pattern regions is not limited to a stripe-like pattern; however, the pattern may be configured with an island-like pattern such as a rectangle or a circle, and the patterns may be arranged at intervals in arrangement such as a square array.

Figure 2:
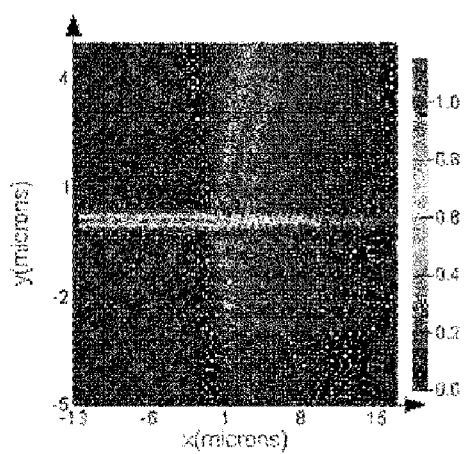
FIG. 2 is a distribution diagram that is obtained by a calculation model of a grating coupler 102 and illustrates an electric field distribution of light emitted from the grating coupler 102.
Figure 11:
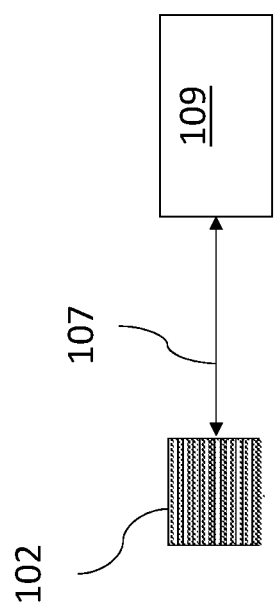

Here, the simplest alignment circuit has a configuration in which light incident from an optical fiber (see optical fiber 107, FIG. 11) via the grating coupler 102 again returns to the grating coupler 102 through a reflection unit such as a reflection mirror (see reflection mirror 109, FIG. 11) provided in a section of the optical waveguide 101 (see FIG. 11) and is then coupled with the optical fiber. Accordingly, alignment is performed by searching for the position and angle at which the light returns to the optical fiber most intensively. FIG. 2 illustrates the electric field distribution of light emitted from the grating coupler 102 by a basic calculation model of the grating coupler 102.

Figure 3:
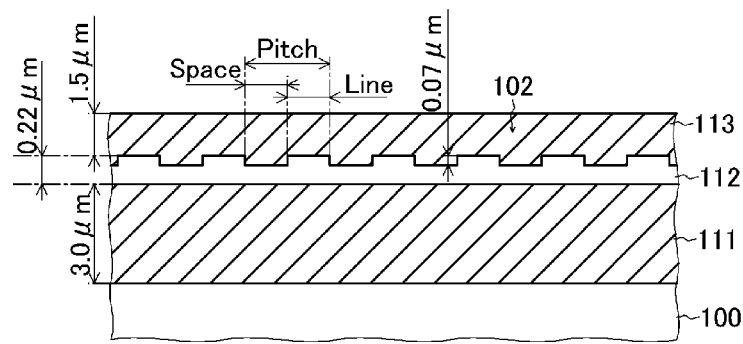
FIG. 3 is a cross-sectional view that illustrates a partial configuration of the alignment optical circuit in the embodiment of the present invention.

As illustrated in FIG. 3, a layer structure used for calculation includes a lower clad layer 111 formed on the substrate 100, a core 112 formed on the lower clad layer 111n, and an upper clad layer 113 formed on the lower clad layer 111 to cover the core 112. Further, gratings are formed on an upper surface of the core 112 and serve as the grating coupler 102. Note that in a region not illustrated in FIG. 3, the optical waveguide 101 is configured with the core 112 in which no grating is formed.

The above-described configuration may be formed by using a well-known SOI (Silicon on Insulator) substrate, for example. The lower clad layer 111 is configured with an embedded insulator ($SiO_2$) layer, with a thickness of approximately 3 µm, of the SOI substrate, patterning with a surface silicon layer with a thickness of approximately 0.22 µm is performed, and the core 112, gratings, and so forth are thereby configured. The grating has a depth of 70 nm, an interval of 630 nm, and a fill factor of 50%. Further, the upper clad layer 113 may be formed by depositing silicon oxide and have a thickness of approximately 1.5 µm.

As illustrated in FIG. 2, light is emitted at an angle from the grating coupler and is emitted while being inclined at an angle of about 15 deg. from a perpendicular line with respect to a substrate surface. Alignment for six axes is performed for the light emitted obliquely in such a manner.

Figure 4:
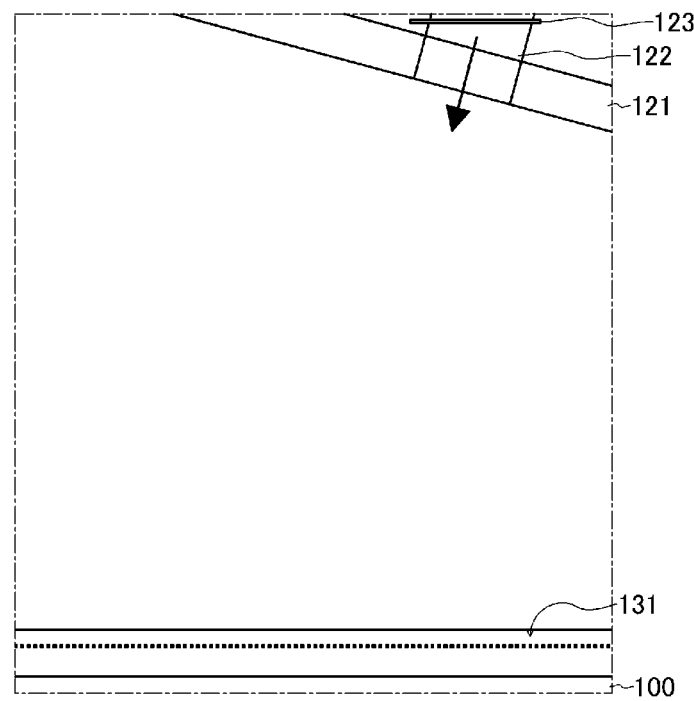
FIG. 4 is a configuration diagram that illustrates a configuration of a model used in simulation of reflected light from a pattern region.

Next, a description will be made about the first pattern region 103, the second pattern region 104, and the third pattern region 105 in the embodiment. When alignment for the grating coupler 102 is conducted, the first pattern region 103, the second pattern region 104, and the third pattern region 105 arranged in the periphery of the grating coupler 102 are irradiated with light from the optical fiber. Depending on presence or absence and shapes of the first pattern region 103, the second pattern region 104, and the third pattern region 105, the intensity of reflection (diffused reflection) of the Here, a description will be made about simulation of reflected light from the pattern regions. In this simulation, a model illustrated in FIG. 4 is used. An SMF 121 formed with a core 122 formed of silicon is arranged 50 μm above the substrate 100. Further, in a state where an optical axis of the SMF 121 is inclined at 15 deg. from a perpendicular line with respect to the plane of the substrate 100, a pattern region 131 having plural patterns configured with silicon is irradiated with light from the SMF 121. This light irradiation causes diffused reflection of light on the pattern region 131, the diffusely reflected light is incident on an output light monitor 123 provided to the SMF 121, and the light intensity of the incident light is monitored.

Figure 5:
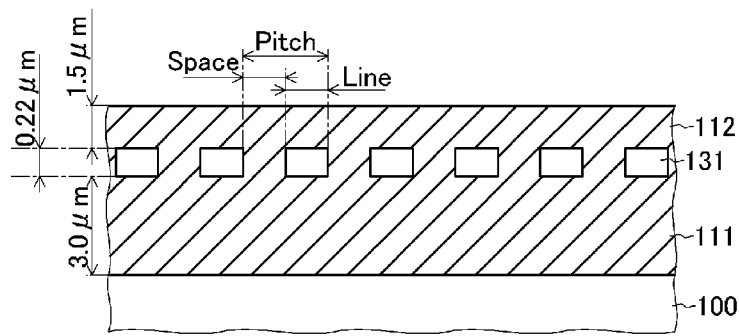
FIG. 5 is a cross-sectional view that illustrates a partial configuration of the alignment optical circuit in the embodiment of the present invention.

The pattern region 131 is formed on a surface silicon layer forming a core in which gratings are formed. Differently from the gratings, the pattern region 131 is formed, by an etching process passing through the surface silicon layer, into a state where each pattern is separated as illustrated in FIG. 5 and is configured with plural stripe-like patterns, for example.

Figure 6:
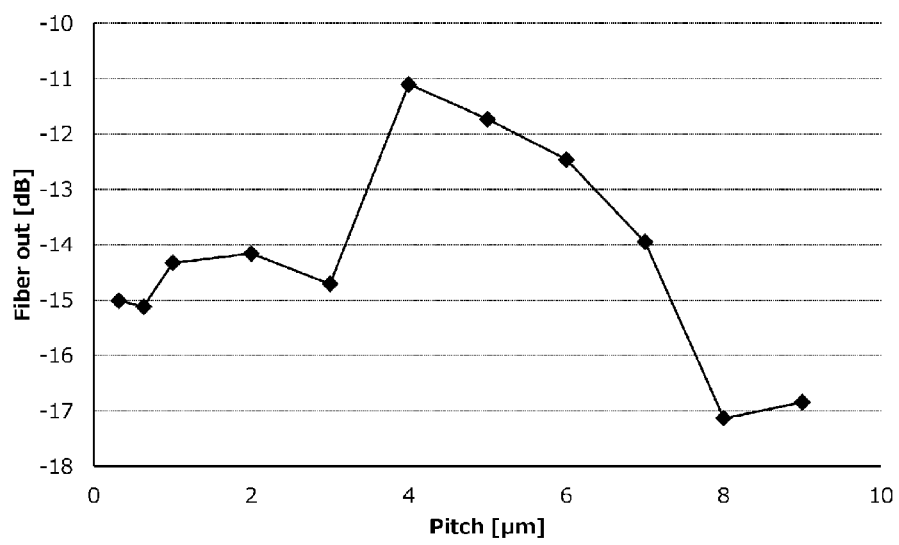
FIG. 6 is a characteristic diagram that represents the ratio of intensity of returning light to an optical fiber in a case where an interval (Pitch) is changed in a state where the ratio between a pattern portion (Line) and a space portion (Space) other than that is retained.

Here, FIG. 6 represents the ratio of intensity of returning light to the optical fiber (the ratio of the returning light to the incident light) in a case where the interval (Pitch) is changed in a state where the ratio between a pattern portion (Line) and a space portion (Space) other than that (fill factor=Line/Pitch=0.5) is retained in a planar view. Note that the pattern portion (Line) is formed of silicon, and the space portion (Space) is formed of silicon oxide.

As represented in FIG. 6, a returning light intensity becomes a maximum of −11 dB at an interval (Pitch) of 4 μm, and the returning light intensity stepwise decreases to an interval (Pitch) of 8 μin and becomes a minimum of −17.1 dB at an interval (Pitch) of 8 μm.

Figure 7A:
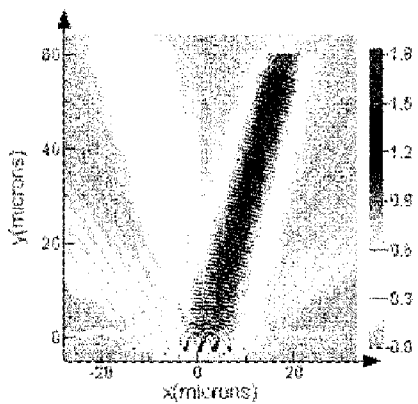
FIG. 7A is a distribution diagram that illustrates the electric field distribution of reflected light in a pattern region with plural patterns with an interval (Pitch) of 4 µm.
Figure 7B:
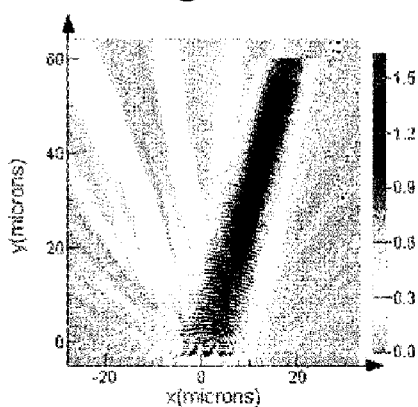
FIG. 7B is a distribution diagram that illustrates the electric field distribution of reflected light in a pattern region with plural patterns with an interval (Pitch) of 8 µm.

FIG. 7A illustrates the electric field distribution of the reflected light at an interval (Pitch) of 4 μm. Further, FIG. 7B illustrates the electric field distribution of the reflected light at an interval (Pitch) of 8 μm. In both of those, the light is diffused by the pattern region and is diffusely reflected in various directions. The result is that the above-described intensity indicates the amount of the diffused light that returns to the optical fiber.

As described above, the returning light intensity due to diffused reflection may be changed by changing the structure (configuration) of the pattern region with patterns at intervals. By using the change in diffused reflection due to the difference in the pattern region, the first pattern region 103 configured with plural patterns at an interval of 4 μm, the second pattern region 104 configured with plural patterns at an interval of 7 μm, and the third pattern region 105 configured with plural patterns at an interval of 8 μm are geometrically arranged as illustrated in FIG. 1. In this case, optical fiber returning light in the first pattern region 103 indicates −11.1 dB. Further, the optical fiber returning light in the second pattern region 104 indicates −14.0 dB. Further, the optical fiber returning light in the third pattern region 105 indicates −17.1 dB. Each of the pattern regions becomes a reflection region in a different reflection state.

Figure 8:
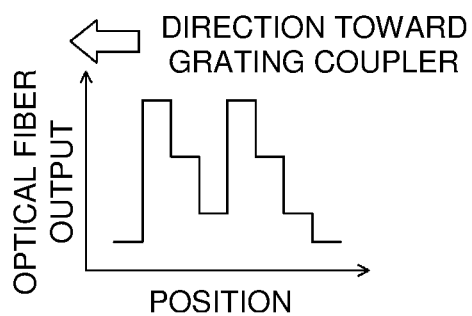
FIG. 8 is a characteristic diagram that represents an intensity profile of the returning light to the optical fiber in a case where the alignment optical circuit in the embodiment of the present invention is used.

The first pattern region 103, the second pattern region 104, and the third pattern region 105 are arranged as illustrated in FIG. 1, the returning light is measured while the optical fiber is scanned in X direction and Y direction, and the present relative positional relationship between the optical fiber and the grating coupler 102 may thereby be specified. For example, when the optical fiber is scanned in the direction of a line in a position on line aa' or a position on line bb indicated in FIG. 1, an intensity profile of the returning light as represented in FIG. 8 may be obtained. It may be known from this result that the grating coupler 102 is present in the direction of the arrow in FIG. 8, and the direction for alignment may be specified.

Figure 9A:
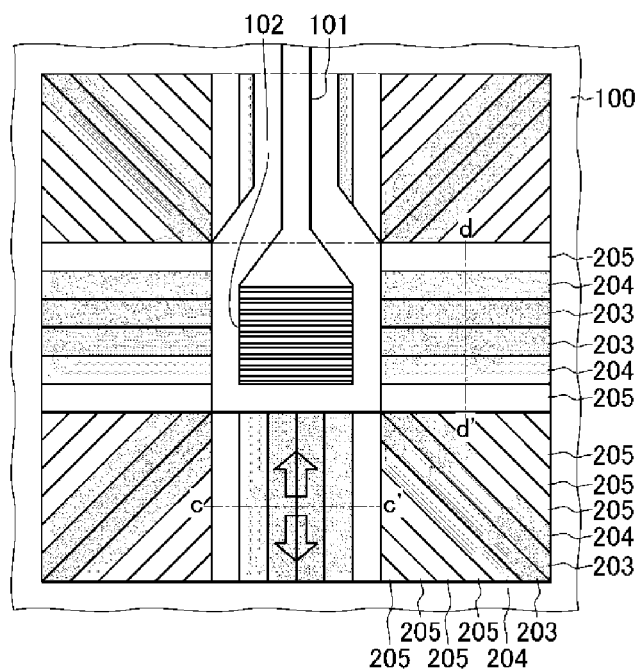
FIG. 9A is a plan view that illustrates a configuration of another alignment optical circuit in the embodiment of the present invention.
Figure 9B:
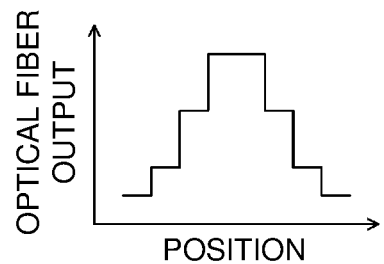
FIG. 9B is a characteristic diagram that represents the intensity profile of the returning light to the optical fiber in a case where another alignment optical circuit in the embodiment of the present invention is used.
Figure 10:
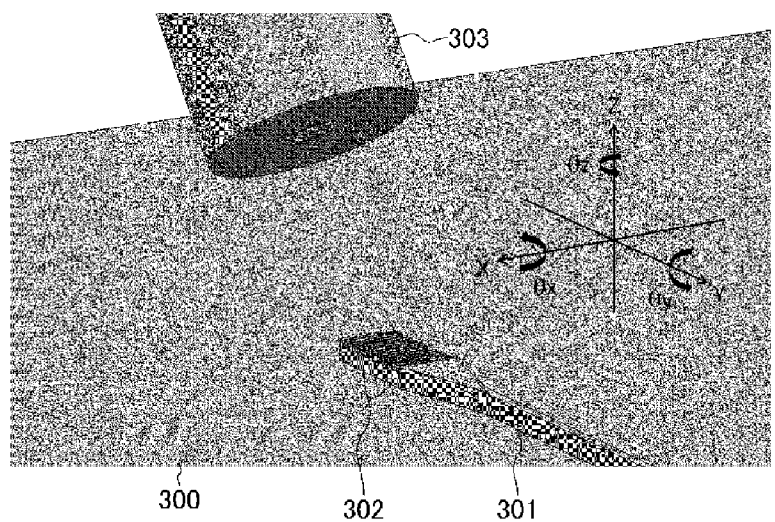
FIG. 10 is a perspective view that illustrates an alignment state of an SMF 303 with respect to a grating coupler 302.

Note that an alignment optical circuit may be configured as illustrated in FIG. 9A. This alignment optical circuit includes a first pattern region 203 arranged to surround the grating coupler 102, a second pattern region 204 arranged to surround the grating coupler 102, and a third pattern region 205 arranged to surround the grating coupler 102.

The first pattern region 203 is configured with plural patterns arrayed at intervals of a first gap. Further, the second pattern region 204 is configured with plural patterns arrayed at intervals of a second gap different from the first gap. Further, the third pattern region 205 is configured with plural patterns arrayed at intervals of a third gap different from the first gap and the second gap.

In this example, in the periphery of the grating coupler 102, the first pattern region 203, the second pattern region 204, and the third pattern region 205 are formed in respective strip-like regions extending in directions away from the grating coupler 102. Further, in the periphery of the grating coupler 102, the first pattern region 203, the second pattern region 204, and the third pattern region 205 are arrayed in the circumferential direction.

Further, in this example, plural patterns configuring the first pattern region 203 are formed in a stripe shape extending in the directions away from the grating coupler 102. The second pattern region 204 and the third pattern region 205 are formed similarly.

In the example illustrated in FIG. 9A, in right and left regions of the grating coupler 102, the first pattern region 203, the second pattern region 204, and the third pattern region 205 are arrayed in an up-down direction. Further, in upper and lower regions of the grating coupler 102, the first pattern region 203, the second pattern region 204, and the third pattern region 205 are arrayed in a left-right direction. Further, in upper left and lower right regions of the grating coupler 102, the first pattern region 203, the second pattern region 204, and the third pattern region 205 are arrayed in a direction from lower left to upper right. Further, in upper right and lower left regions of the grating coupler 102, the first pattern region 203, the second pattern region 204, and the third pattern region 205 are arrayed in a direction from lower right to upper left.

The plural patterns configuring the first pattern region 203 are formed at an interval of 4 μm, for example. Further, the plural patterns configuring the second pattern region 104 are formed at an interval of 7 μm, for example. Further, the plural patterns configuring the third pattern region 105 are formed at an interval of 8 μm, for example.

The first pattern region 203, the second pattern region 204, and the third pattern region 205 are arranged as illustrated in FIG. 9A, the returning light is measured while the optical fiber is scanned in X direction and Y direction, and the present relative positional relationship between the optical fiber and the grating coupler 102 may thereby be specified. For example, when the optical fiber is scanned in the direction of a line in a position on line cc' or a position on line dd' indicated in FIG. 9A, the intensity profile of the returning light as represented in FIG. 9A may be obtained. It may be known from this result that for example, on line cc', the grating coupler 102 is present along a region in which the returning light intensity is high and in the directions of the arrows in the up-down direction in FIG. 9A, and the direction for alignment may be specified.

As described above, in embodiments of the present invention, the first pattern region configured with plural patterns arrayed at the first gap and the second pattern region configured with plural patterns arrayed at the second gap different from the first gap are arranged in the periphery of the grating coupler, and alignment for obtaining optical connection between the optical fiber and the grating coupler may thus be conducted easily.

In positioning between the optical fiber and the grating coupler, the optical fiber is first arranged by aiming at a position somewhat close to the grating coupler. However, although the grating coupler is as small as several ten μm square in a planar view, the optical fiber is as large as having a diameter of approximately 0.1 mm. Thus, it is very difficult to know the relative position by a visual measure using a camera or the like. On the other hand, in this embodiment, the relative positional relationship of the optical fiber to the grating coupler may be understood more quickly, and time needed for alignment may thus be shortened.

Note that the present invention is not limited to the embodiment described above, and it is clear that many modifications and combinations may be carried out by a person having ordinary skill in the art in the technical idea of the present invention. For example, the above description mainly targets an optical waveguide formed with a core formed of silicon; however, optical waveguides are not limited to this, but the same applies to optical waveguides formed with a core formed of another semiconductor.

REFERENCE SIGNS LIST

100 substrate
101 optical waveguide
102 grating coupler
103 first pattern region
104 second pattern region
105 third pattern region.

The invention claimed is:

1. An alignment optical circuit comprising:
an optical waveguide in which a grating coupler is disposed;
a first pattern region surrounding the grating coupler and comprising plural first patterns arrayed at a first pitch between each of the plural first patterns; and
a second pattern region surrounding the grating coupler and comprising plural second patterns arrayed at a second pitch between each of the plural second patterns, wherein the second pitch is different from the first pitch, and wherein the first pattern region is adjacent to the second pattern region.

2. The alignment optical circuit according to claim 1, wherein the plural first patterns and the plural second patterns each comprise stripe-like patterns.

3. The alignment optical circuit according to claim 1, further comprising:
a third pattern region surrounding the grating coupler and comprising plural third patterns arrayed at a third interval of a third pitch, wherein the third pitch is different from the first pitch and the second pitch, and wherein the third pattern region is adjacent to the first pattern region or the second pattern region.

4. The alignment optical circuit according to claim 3, wherein the plural third patterns comprise stripe-like patterns.

5. The alignment optical circuit according claim 1 further comprising a reflector that reflects light guided in the optical waveguide through coupling by the grating coupler and returns the light to the grating coupler.

6. A method comprising:
forming an optical waveguide in which a grating coupler is formed;
forming a first pattern region surrounding the grating coupler and comprising plural first patterns arrayed at a first pitch between each of the plural first patterns; and
forming a second pattern region surrounding the grating coupler and comprising plural second patterns arrayed at a second pitch between each of the plural second patterns, wherein the second pitch is different from the first pitch, and wherein the first pattern region is adjacent to the second pattern region.

7. The method according to claim 6, wherein the plural first patterns and the plural second patterns each comprise stripe-like patterns.

8. The method according to claim 6, further comprising:
forming a third pattern region surrounding the grating coupler and comprising plural third patterns arrayed at a third pitch between each of the plural third patterns, wherein the third pitch is different from the first pitch and the second pitch, and wherein the third pattern region is adjacent to the first pattern region or the second pattern region.

9. The method according to claim 8, wherein the plural third patterns comprise stripe-like patterns.

10. The method according to claim 6, further comprising:
forming a reflector that reflects light guided in the optical waveguide through coupling by the grating coupler and returns the light to the grating coupler.

* * * * *